United States Patent
Angus et al.

(10) Patent No.: US 6,723,539 B1
(45) Date of Patent: Apr. 20, 2004

(54) ABSORBENT MEDIUM CONTAINING PARTICLES OF CHOPPED CELLULOSE OR AGAROSE SPONGE MATERIAL HAVING FUNCTIONAL GROUPS

(75) Inventors: Katherine Louise Angus, Co. Durham (GB); David Alan Hutton, Co. Durham (GB); Robert John Noel, Co. Durham (GB); Linda Taylor, Co. Durham (GB)

(73) Assignee: BioProcessing, Ltd. (GB)

( * ) Notice: Subject to any disclaimer, the term of this patent is extended or adjusted under 35 U.S.C. 154(b) by 0 days.

(21) Appl. No.: 09/806,548

(22) PCT Filed: Oct. 5, 1999

(86) PCT No.: PCT/GB99/03290

§ 371 (c)(1),
(2), (4) Date: Aug. 13, 2001

(87) PCT Pub. No.: WO00/20114

PCT Pub. Date: Apr. 13, 2000

(30) Foreign Application Priority Data

Oct. 6, 1998 (GB) ............................................. 9821783

(51) Int. Cl.$^7$ .................. C12P 19/34; C12N 11/10; C07K 17/10; C07H 21/00; C07H 1/06
(52) U.S. Cl. ................. 435/91.1; 435/178; 435/179; 435/803; 530/413; 530/813; 530/814; 536/22.1; 536/56; 536/127
(58) Field of Search ................. 435/91.1, 178, 435/179, 803; 530/413, 813, 814; 536/22.1, 56, 127

(56) References Cited

U.S. PATENT DOCUMENTS

| 4,154,676 A | 5/1979 | Jones et al. ................ 210/40 |
| 4,332,916 A | 6/1982 | Thill ................................. 521/25 |
| 5,162,404 A | 11/1992 | Rainer ............................. 524/30 |
| 5,241,998 A | 9/1993 | Ashraf-Khorassani ....... 141/67 |

FOREIGN PATENT DOCUMENTS

| EP | 0451706 A1 | 10/1991 |
| EP | 0451706 B1 | 2/1994 |
| EP | 0530258 B1 | 9/1995 |
| EP | 0837091 A1 | 4/1998 |
| GB | 914421 | 1/1963 |
| GB | 1226448 | 3/1971 |
| WO | 91/17830 | 11/1991 |
| WO | 94/11103 | 5/1994 |

OTHER PUBLICATIONS

Database WPI, Section Ch, Week 199029, Derwent Publications Ltd., London, GB; AN 1990–220679; XP002123920 & JP 02 149341 A (Kanegafuchi Chem KK), Jun. 7, 19090 [Abstract].

Database WPI, Section Ch, Week 198646, Derwent Publications Ltd., London, GB; AN 1986–303144; XP002123921 & JP 61 226059 A (Agency of Ind Sci & Technology), Oct. 7, 1986 [Abstract].

Primary Examiner—David M. Naff
(74) Attorney, Agent, or Firm—Saliwanchik, Lloyd & Saliwanchik

(57) ABSTRACT

An adsorbent medium is prepared comprising particles of a sponge material made of cellulose or agarose carrying functional groups such as diethylaminoethane groups. The particles may be obtained by chopping a larger block of the sponge material. The medium preferably has a water retention value of greater than 6 ml/g and a particle size of 0.5 to 10 mm, and the sponge material may be cross-linked. The adsorbent medium is especially useful for purifying DNA in an aqueous sample.

18 Claims, No Drawings

ABSORBENT MEDIUM CONTAINING PARTICLES OF CHOPPED CELLULOSE OR AGAROSE SPONGE MATERIAL HAVING FUNCTIONAL GROUPS

This application is a National Stage Application of International Application Number PCT/GB99/03290, published, pursuant to PCT Article 21(2), in English.

FIELD OF THE INVENTION

This invention relates to an adsorbent medium and to its use in retaining large molecular species, e.g. in the purification of DNA.

BACKGROUND OF THE INVENTION

DEAE (diethylaminoethane) has been used to derivatise Sepharase or Sephadex beads to provide an anion exchange resin, having quaternary ammonium groups. This is available from Pharmacia as DEAE-streamline. It is used as an anticholesteremic.

Cellulosic sponge materials have been used in various forms as the basis of an adsorbent medium, typically after the introduction of ion-exchange groups. For example, GB-A-1226448 discloses the introduction of cross-linking residues into regenerated cellulose, together with or followed by the introduction of ion-exchange groups. The resultant medium can be used, packed in a column. Various physical forms are disclosed.

WO-A-9117830 discloses an adsorbent medium (HVFM) prepared by cross-linking a flexible hydrophilic sponge that contains fibrous, hydrophilic reinforcement, and introducing functional groups. The cross-linking is controlled so that the resulting sponge has a water retention value of 2 to 6. It is proposed that this medium is suitable for the isolation or separation of macromolecules such as proteins, while retaining mechanical strength. However, in addition to its low water retention value, this medium has poor flow properties.

A particular area in which an efficient, commercial process is required, for purifying samples, is in the preparation of pharmaceutical grade plasmid DNA for gene therapy. Although many processes have been developed for the large-scale production of recombinant plasmid DNA, e.g. using E. coli as the host cell, purification of the product is necessary before the functional gene can be used, i.e. for expression in somatic tissues with the intention of selectively correcting or modulating disease conditions.

Purification of plasmid DNA has traditionally been on a very small scale for research purposes. Purification of plasmid DNA for preclinical toxicology, human clinical trials, and ultimately for an approved pharmaceutical indication, requires a process that reproducibly meets all the quality and regulatory standards and can be used to purify large quantities of the material economically.

The standard method for plasmid DNA purification by molecular biologists has been by caesium chloride/ethidium bromide ultracentrifugation. This method is unacceptable for the production of clinical materials, because it uses mutagenic reagents and is unscalable.

Alternative methods for the purification of plasmid DNA have been developed using a combination of chromatography techniques. Problems associated with such techniques have been low capacity of the adsorbents for plasmid DNA, denaturation and breakdown of the DNA molecule, and losses due to filtration of the feedstock containing plasmid DNA. Problems associated with filtration have been resolved by using the adsorbents in fluidised bed mode, but this requires specially designed hardware for large-scale applications.

SUMMARY OF THE INVENTION

This invention is based on the discovery that an adsorbent medium comprising particles of a cellulose sponge material carrying functional groups, can be effectively used to retain species having molecular weight of at least one million Daltons, e.g. viruses and DNA. In particular, it has been found that an effective adsorbent can be prepared from readily-available sponge material, after removal of fibrous reinforcement.

The new porous matrix has high capacity for plasmid DNA, and can be used in a packed bed with unfiltered feedstock. It can be used in any type of chromatographic technique, including ion-exchange, and also affinity and hydrophobic interaction.

DESCRIPTION OF THE INVENTION

The cellulosic sponge material, from which the novel medium is derived, is typically a naturally-occurring polymer such as cellulose or agarose.

Cellulosic sponge materials are commercially available, including hydrophilic, fibrous reinforcement. For the purposes of the present invention, this reinforcement can be removed, or at least substantially removed. The water retention of the medium is generally higher than that described in WO-A-9117830, and is typically greater than 6 ml/g, e.g. up to 10 or 11 ml/g.

The material used in the invention is preferably cross-linked. This may be achieved by known procedures. Similarly, the introduction of functional groups may be achieved in known manner, e.g. as described in WO-A-9117830. Suitable ion-exchange groups are known. It is preferred that the functional groups should bind DNA. They may be derived from tertiary amines such as diethylaminoethane (DEAE), or quaternary amines.

The adsorbed medium of this invention may be made into particles of suitable size by any appropriate technique, e.g. chopping. The size of the particles may be heterogeneous; it is not necessary to control its uniformity. The particles will usually be at least 0.1 mm in size, e.g. up to 10 mm or more; a preferred particle size is 0.5 or 1 to 10 mm.

In an illustrative embodiment of the invention, an open structure fibrous polymer adsorbent (HVFM) has been developed for the purification of plasmid DNA. In order to demonstrate its suitability, the material was converted into a weak anion-exchanger (DEAE-HVFM) and used to purify plasmid DNA from unfiltered feedstock.

Particulate HVFM was derivatised, up to a level of 1933 $\mu$moles per g dry weight, with diethylaminoethane (DEAE). The characteristics of particulate DEAE-HVFM for the purification of plasmid DNA from crude feedstock were determined. The dynamic capacity of DEAE-HVFM for plasmid DNA was >1500 $\mu$g.ml$^{-1}$ and 1350 $\mu$g.ml$^{-1}$ at 88 cm.h$^{-1}$ (30 column volumes per hour) and 175 cm.h$^{-1}$ (60 column volumes per hour), respectively.

Analysis of the purified plasmid DNA was carried out by various methods: it contained no detectable amount of RNase and was not damaged by this purification process. The pressure/flow properties of particulate DEAE-HVFM showed that a flow rate of 116 column volumes per hour can be achieved at a pressure of 2.2 bar, across a column having a bed height of 4 cm and which is 2.5 cm in diameter.

The water retention value of the particulate DEAE-HVFM is approximately 10 ml/g. A water retention value of 2 to 6 is quoted for HVFM with a uniformly distributed fibrous reinforcement (WO-A-9117830).

The following Examples illustrate the invention.

White HVFM Cloth (18×20 cm) was washed in tap water at 50° C. followed by RO $H_2O$ and rolled dry. The HVFM was cut into pieces (approximately 2 cm square) and the 'nylon' scrim reinforcement was removed. The HVFM pieces were covered with water in a plastic beaker and homogenised using a hand-held Kenwood Blender for approximately 2 minutes. Homogenised HVFM was poured into a Pharmacia XK-50 column and squeezed dry using the plunger of the column.

430 ml $H_2O$ and 3.5 ml 1,3-dichloropropanol were mixed and added to the homogenised HVFM in a 500 ml glass beaker and stirred gently to mix. The beaker was covered with non-PVC cling film (four sheets) and 1 layer of aluminium foil and incubated for 1 h at 60° C. in an oven. The reagents were poured off and the sponge washed and dried under vacuum suction and then by plunging in an XK-50 column.

55.4 g DEAE was dissolved in 122 ml RO $H_2O$ and poured onto the cross-linked HVFM in a 500 ml glass beaker and gently mixed. 250 ml 5M NaOH was poured evenly onto the HVFM and mixed gently. The beaker was covered in 4 sheets of non-PVC cling film and one sheet of aluminium foil and incubated for 1 h. at 60° C. in an oven. The reagents were poured off and the sponge dried under vacuum suction. Fresh solutions of 45% (w/v) DEAE and 5M NaOH were added to the sponge as above and incubated again at 60° C. The reagents were poured off and the sponge washed extensively under vacuum suction, followed by squeezing dry in an XK-50 column. This procedure gave HVFM derivatised with DEAE.

A 1 ml Omni-fit column (ID 0.66 cm) was prepared by hydrating approximately 1 g wet weight DEAE-HVFM with 20 mM Tris pH 7.5 and packing it into the column using the column plunger. The column was then equilibrated with 0.2M NaCl (adjusted to pH 11.0 with NaOH) at 0.5 ml.min$^{-1}$. 35 ml 12 mM HCl was then washed through the column at 0.5 ml.min$^{-1}$. 1 ml fractions were collected and the pH of each fraction measured. The column was then unpacked and the DEAE-HVFM dried to constant weight at 50° C. in an oven. A graph of pH against mmoles of HCl applied to the column was plotted and the point at which the pH dropped sharply to approximately pH 3.0 was used to calculate the level to which the sponge had been derivatized with DEAE.

In summary, white sponge cloth that had been filleted of its reinforcing mesh and also homogenised was derivatized. The level of derivatization achieved was 1933 μmoles DEAE per g dry weight.

The capacity of DEAE-HVFM (homogenised) was at least 5 times as much as that estimated for DEAE-streamline, i.e. 150–300 μg.mg$^{-1}$. With increased capacity for plasmid DNA, it might be expected that the DEAE-HVFM may also have increased capacity for RNA and protein; therefore, the levels of these residuals between the two matrices was compared. No detectable RNAase, the predominant protein contaminant in the feedstock, was found in the 0.5M and 1.0M elutions of either matrix after NuPAGE electrophoresis and silver staining. RNAase could be detected in the breakthrough and the 20 mM Tris washes from both matrices. Gel filtration on Sephacryl S-500 showed that low molecular weight contaminants were present in the 1.0M elutions from each of the columns. SYBR green II staining of samples of the 1.0M elutions run on 1.0% agarose gels suggested that these contaminants are digested RNA, and the proportion of material in the plasmid DNA peak from the DEAE-HVFM column was greater than that from the DEAE-Streamline column (5.4% cf 1.7%), i.e. a three-fold increase in plasmid DNA purity relative to RNA.

Agarose gel electrophoresis of plasmid DNA eluted from both DEAE-HVFM and DEAE-streamline demonstrated that the plasmid was not damaged by binding and elution from the column. In contrast, silica-based matrices such as that found in the Plasmix purification kit nick the DNA and produce more of the open circular form.

The pressure/flow characteristics of particulate DEAE-HVFM were compared with those of DEAE-HVFM cloth with reinforcement and DEAE-HVFM 'natural' block. For all matrices, the flow rate increased with decreasing bed height. However, when the matrices were compared at a fixed bed height, the particulate DEAE-HVFM had better flow properties. For example, particulate DEAE-HVFM achieved a flow rate of 116 column volumes per hour at a pressure of 2.2 Bar, across a column of dimensions 4.0 cm bed height and 2.5 cm diameter; the flow rates for DEAE-HVFM reinforced cloth and DEAE-HVFM 'natural' block were 79 and 85 column volumes per hour respectively.

The DEAE-HVFM was also found to have better pressure/flow characteristics than whatman express ion-exchangers Q and DEAE.

What is claimed is:

1. An adsorbent medium comprising particles of a chopped sponge material made from cellulose or agarose carrying functional groups, wherein the particles are of heterogeneous particle size and are obtained by chopping a larger block of the sponge material made from cellulose or agarose.

2. A medium according to claim 1, wherein the sponge material is free of fibrous reinforcement.

3. A medium according to claim 1, which has a water retention value of greater than 6 ml/g.

4. A medium according to claim 1, wherein the polymer is cellulose.

5. A medium according to claim 1, wherein the functional groups bind DNA.

6. A medium according to claim 5, wherein the functional groups are derived from DEAE diethylaminoethane.

7. A medium according to claim 1, wherein the particles are 0.5 to 10 mm in size.

8. A medium according to claim 1, capable of retaining species having a molecular weight of at least one million Daltons.

9. A medium according to claim 1, wherein the sponge material is cross-linked.

10. A medium according to claim 2, wherein the particles are cross-linked.

11. A medium according to claim 10, wherein the particles are 0.5 to 10 mm in size.

12. A medium according to claim 11 having a water retention value of greater than 6 ml/g.

13. A medium according to claim 3, wherein said sponge material comprises particles that are cross-linked.

14. A medium according to claim 13, wherein said particles are 0.5 to 10 mm in size.

15. The medium according to claim 5, wherein the functional groups are tertiary amines or quaternary amines.

16. The medium according to claim 15, wherein the tertiary amine is diethylaminoethane (DEAE).

17. A medium according to claim 1, wherein the polymer is agrose.

18. A method for purifying DNA in an aqueous sample, which comprises passing the sample through a medium according to claim 1.

* * * * *

UNITED STATES PATENT AND TRADEMARK OFFICE
CERTIFICATE OF CORRECTION

PATENT NO. : 6,723,539 B1
DATED : April 20, 2004
INVENTOR(S) : Katherine Louise Angus et al.

It is certified that error appears in the above-identified patent and that said Letters Patent is hereby corrected as shown below:

<u>Column 4,</u>
Line 40, "A medium according to claim 5, wherein the functional groups are derived from DEAE diethylaminoethane." should read -- A medium according to claim 5, wherein the functional groups are derived from diethylaminoethane (DEAE). --

Signed and Sealed this

Sixteenth Day of November, 2004

JON W. DUDAS
*Director of the United States Patent and Trademark Office*